United States Patent
Kammel et al.

(10) Patent No.: US 9,227,631 B2
(45) Date of Patent: Jan. 5, 2016

(54) METHOD FOR SAFELY PARKING A VEHICLE IN AN EMERGENCY SITUATION

(71) Applicant: ROBERT BOSCH GMBH, Stuttgart (DE)

(72) Inventors: Soeren Kammel, San Jose, CA (US);
Jan Becker, Palo Alto, CA (US);
Werner Poechmueller, Hildesheim (DE); Stefan Nordbruch, Kornwestheim (DE); Gunther Schaaf, Kornwestheim (DE); Peter Busch, Ludwigsburg (DE);
Kurt Eckert, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/357,456

(22) PCT Filed: Sep. 17, 2012

(86) PCT No.: PCT/EP2012/068212
§ 371 (c)(1),
(2) Date: May 9, 2014

(87) PCT Pub. No.: WO2013/072095
PCT Pub. Date: May 23, 2013

(65) Prior Publication Data
US 2015/0006012 A1     Jan. 1, 2015

(30) Foreign Application Priority Data

Nov. 14, 2011 (DE) .......................... 10 2011 086 241

(51) Int. Cl.
*B60W 40/08* (2012.01)
*B60W 30/18* (2012.01)
(Continued)

(52) U.S. Cl.
CPC .............. *B60W 30/06* (2013.01); *B60K 28/066* (2013.01); *B60W 50/087* (2013.01); *B60W 50/14* (2013.01);
(Continued)

(58) Field of Classification Search
CPC ..... G05D 1/021; G05D 1/0088; B60W 30/06; B60W 2050/0095; B62D 15/0285; B62D 1/286; B62D 15/025; B62D 15/027; B62D 15/028; A01D 34/008; G08G 1/168
See application file for complete search history.

(56) References Cited

U.S. PATENT DOCUMENTS 8,299,941 B2 * 10/2012 Faber .......................... 340/932.2
8,942,880 B2 * 1/2015 Nordbruch ............ B60W 40/08
340/436

(Continued)

FOREIGN PATENT DOCUMENTS

DE      101 26 224        12/2002
DE    10 2007 046 037     4/2009
(Continued)

OTHER PUBLICATIONS

International Search Report for PCT/EP2012/068212, dated May 2, 2013.

*Primary Examiner* — James Trammell
*Assistant Examiner* — Demetra Smith-Stewart
(74) *Attorney, Agent, or Firm* — Kenyon & Kenyon LLP

(57) ABSTRACT

In a method for safely parking a vehicle, it is checked whether an emergency situation is present, and the vehicle is driven by the driver assistance system to a road shoulder upon recognition of an emergency situation. In controlling the driving operation, information is requested from an external database and taken into account by the driver assistance system.

14 Claims, 1 Drawing Sheet

(51) Int. Cl.
*B60K 28/02* (2006.01)
*B60W 30/06* (2006.01)
*B60K 28/06* (2006.01)
*B60W 50/08* (2012.01)
*B60W 50/14* (2012.01)
*B60W 30/12* (2006.01)
*B60W 30/14* (2006.01)
*B60W 50/00* (2006.01)

(52) U.S. Cl.
CPC .............. *B60W 30/12* (2013.01); *B60W 30/143* (2013.01); *B60W 30/18109* (2013.01); *B60W 2050/0071* (2013.01); *B60W 2050/0073* (2013.01); *B60W 2050/143* (2013.01); *B60W 2520/10* (2013.01); *B60W 2540/22* (2013.01); *B60W 2540/24* (2013.01); *B60W 2540/26* (2013.01); *B60W 2550/10* (2013.01); *B60W 2550/30* (2013.01); *B60W 2550/402* (2013.01)

(56) References Cited

U.S. PATENT DOCUMENTS

| | | | |
|---|---|---|---|
| 9,108,592 B2 * | 8/2015 | Nordbruch | B60R 99/00 1/1 |
| 2011/0112746 A1 * | 5/2011 | Takazawa et al. | 701/117 |
| 2013/0231824 A1 * | 9/2013 | Wilson et al. | 701/26 |
| 2013/0289825 A1 * | 10/2013 | Noh et al. | 701/42 |
| 2014/0121883 A1 * | 5/2014 | Shen et al. | 701/28 |

FOREIGN PATENT DOCUMENTS

| | | |
|---|---|---|
| DE | 102007046037 B3 * | 4/2009 |
| DE | 102009016936 A1 * | 11/2009 |
| EP | 0 913 751 | 5/1999 |
| EP | 1 357 529 | 10/2003 |
| WO | WO 2004/101306 | 11/2004 |
| WO | WO 2005/021344 | 3/2005 |
| WO | WO 2006/075489 | 7/2006 |
| WO | WO 2006/127281 | 11/2006 |

* cited by examiner

METHOD FOR SAFELY PARKING A VEHICLE IN AN EMERGENCY SITUATION

BACKGROUND OF THE INVENTION

1. Field of the Invention

The present invention relates to a method for safely and automatically parking a vehicle.

2. Description of the Related Art

A device for increasing safety in traffic is known from published German patent document DE 10 2007 046 037 B3. A driver health computing module is provided which computes from signals of health data sensors a particular priority intervention situation, for example. An intervention module is provided which implements the particular intervention situation into corresponding responses and measures. A vehicle interference module is provided which reports vehicle data to the intervention module and outputs commands to individual vehicle subsystems upon request by the intervention module in order to, for example, automatically initiate measures for minimizing the risks or necessary rescue measures if the health state of a driver suddenly worsens. If an acute health endangerment is recognized, the vehicle is automatically decelerated slowly and driven to the right-hand road shoulder.

BRIEF SUMMARY OF THE INVENTION

The object of the present invention is to provide an improved method and an improved computing unit.

One advantage of the method according to the present invention is that information is requested from an external database and taken into account by the driver assistance system. In this way, instantaneous information about the vehicle surroundings, the traffic, the weather, the traffic situation, as well as instantaneous information about lane closures, construction sites, an optimal stopping place for parking the vehicle is requested from the external database. Therefore, the driver assistance system has more and/or more instantaneous information at its disposal. This may make parking of the vehicle safer and also faster.

The vehicle is, for example, driven to the road shoulder and parked. It may be parked on the right-hand or on the left-hand road shoulder depending on the driving direction. In another specific embodiment, the vehicle is decelerated and stopped in the lane in which it is located at that time. For example, the hazard lights are switched on in this case in order to indicate the stopping of the vehicle and to warn the following traffic. In addition, the presence of an emergency situation may be transmitted to other vehicles via a data transmission in the form of a vehicle-to-vehicle communication.

In another specific embodiment, the driver assistance system accesses data on a digital map regarding the road shoulder. In this way, an optimal strategy for parking the vehicle on the road shoulder may be developed based on the data. Preferably, occurrences on the road shoulder, such as a ramp, a bridge pillar, a slope, roadway characteristics, e.g., an unsurfaced road shoulder or a tarred standing lane, may be recognized and taken into account. In addition, the data about the road shoulder may also be received from other vehicles via a data transmission in the form of a vehicle-to-vehicle communication.

In another specific embodiment, an emergency situation is recognized, when the driver does not accept the return of a driving function which is carried out by the driver assistance system.

In another specific embodiment, tiredness, the state of distraction, or the health state of the driver are checked to recognize an emergency situation. In this way, any problems that the driver may have may be recognized and safe parking of the vehicle may be initiated.

In another specific embodiment, the weight distribution of the driver is monitored to recognize an emergency situation. In the case of a predefined deviation of the weight distribution from a predefined standard distribution, an emergency situation is recognized and parking of the vehicle is initiated. By monitoring the weight distribution, the driver fainting and a shift of the weight connected thereto may be easily and reliably recognized, for example.

In another specific embodiment, a technical function of the vehicle is checked for correct functionality. If the check results in the function not meeting a predefined functionality, an emergency situation is recognized. In this way, vehicular technical emergency situations may also be recognized and taken into account for triggering a safe parking operation.

For example, the functionality of a safety function such as a brake or a correct tire pressure may be checked using the method described above.

In another specific embodiment, the surroundings of the vehicle are detected with the aid of sensors and taken into account by the driver assistance system. In this way, the current traffic situation or the current weather situation, e.g., snow or ice, may be detected, for example, and taken into account by the driver assistance system during safe parking. In addition, the traffic density and the speed of the traffic flow may be detected and taken into account by the driver assistance system during the safe parking of the vehicle.

In another specific embodiment, the speed of a following vehicle and/or a distance from the following vehicle is/are detected and taken into account by the driver assistance system, in particular while braking and changing lanes during the safe parking of the vehicle. In this way, safety continues to be increased during the automatic parking of the vehicle.

In another specific embodiment, data about the road shoulder in the driving direction up to an established distance from the vehicle are checked for a suitable stopping place and a stopping place is selected. The driver assistance system drives the vehicle to the selected stopping place and parks the vehicle. Thus, safe parking of the vehicle at an optimal stopping place located within an established range may be carried out regardless of the information from the sensors of the vehicle, even if another suitable stopping place is taken into account which is farther away. In this way, safety is increased during the parking of the vehicle.

In another specific embodiment, additional data about the health of the driver are automatically transmitted from an external database to a rescue center upon recognition of an emergency situation. In this way, the rescue center is provided with important information regarding taking care of a driver who is in frail health. The information about the driver may be provided rapidly and easily by accessing the external database.

In another specific embodiment, technical data about the vehicle are automatically transmitted to a rescue center upon recognition of an emergency situation. In this way, the recovery or a technical repair of the vehicle on-site may be improved, for example. Depending on the selected specific embodiment, the technical data of the vehicle may be detected by the sensors of the vehicle and/or read out and transmitted from an internal or external database. Access to the external database offers the advantage that data may be transmitted rapidly and reliably. In addition, a database having comprehensive information about various vehicles may be accessed, for example, by indicating a vehicle identification, and technical data may be transmitted. Thus, recovery and/or repair of the vehicle on-site may be carried out more efficiently.

In another specific embodiment, a message is output to the driver upon recognition of increased tiredness of the driver, the frequency of the output or the intensity of the output being a function of the degree of the driver's tiredness. Thus, an improved warning for the driver is achieved.

DETAILED DESCRIPTION OF THE INVENTION

Figure 1:
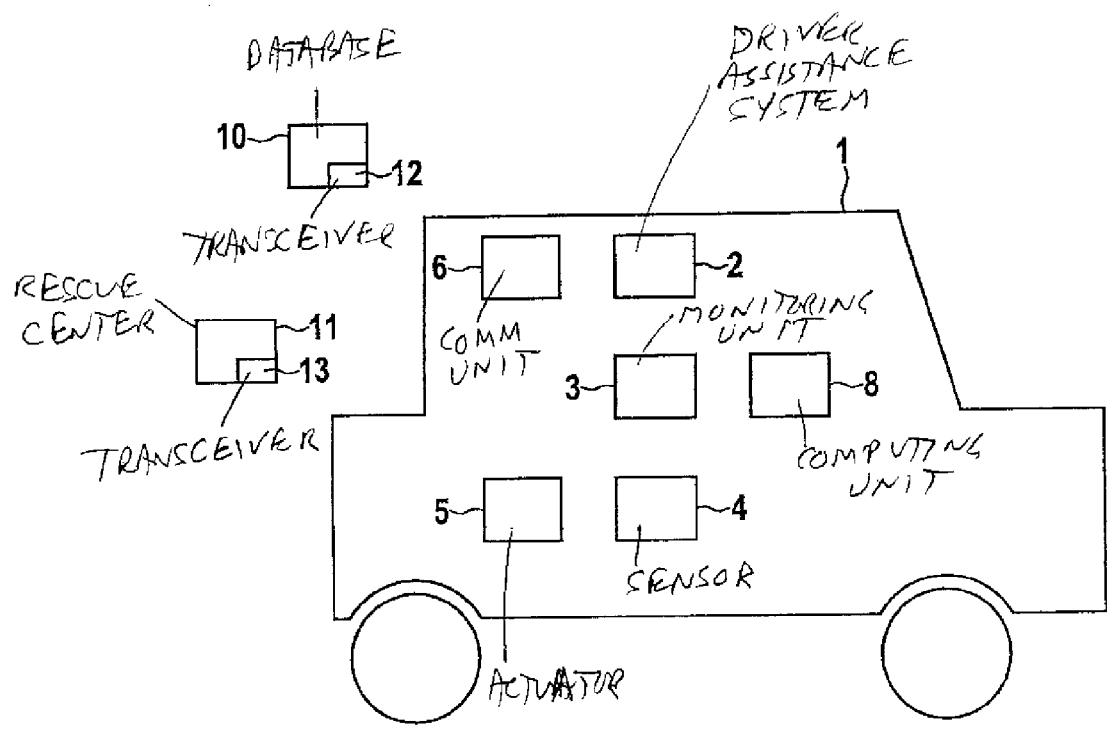
FIG. 1 shows a schematic representation of a vehicle, an external database, and a rescue center.

FIG. 1 shows a schematic representation of a vehicle 1 which has a driver assistance system 2, a monitoring unit 3, a sensor 4, an actuator 5, a communication unit 6, and a data memory 7. The individual elements of the vehicle are in contact with each other via data and/or control lines.

The driver assistance system may, for example, be designed as a navigation system having a digital road map. In addition, the driver assistance system may be designed as an automatic distance control, e.g., with the aid of radar sensors and/or video sensors, which automatically keeps a predefined distance from a preceding vehicle. Furthermore, the driver assistance system may be designed as a lane keeping system which, for example, controls lane keeping with the aid of an optical camera. In addition, the driver assistance system may be designed as a lateral monitoring system which, for example, monitors adjacent lanes with the aid of ultrasonic sensors and warns the driver in the event of a collision risk during lane change. Depending on the selected specific embodiment, one or multiple driver assistance systems may be provided in vehicle 1. The driver assistance systems are designed in such a way that they support the driver in guiding the vehicle. Essential tasks are, for example, automatic cruise control, lane keeping, and distance control.

Communication unit 6 is designed to establish a data link to an external computing unit. Communication unit 6 may, for example, be implemented as a mobile phone which is permanently installed in vehicle 1. In addition, a mobile device, e.g., a smart phone, may be used. Instantaneous information concerning traffic, e.g., congestion or an accident, or about the roads, e.g., a short-term road closure, may be received with the aid of communication unit 6 via access to an external computer or an external database. In addition, communication unit 6 may be designed to exchange data, e.g., positions and/or speed, with other vehicles. Sensors 4 may, for example, be designed in the form of a radar, ultrasonic, or video sensor for detecting or recognizing surrounding objects. Furthermore, sensor 4 may be designed as an inertial sensor system for detecting the instantaneous motion state of the vehicle. In addition, sensor 4 may be designed as a locating system for detecting the instantaneous position of the vehicle. Furthermore, sensor 4 may also be designed as a monitoring sensor for detecting a function or a behavior of the vehicle, e.g., as an air-pressure sensor in the tires.

Actuator 5 may represent any type of actuator in the vehicle, e.g., a braking system, a steering system, or a fuel injection system.

Monitoring unit 3 is designed to monitor important vital functions of the driver and to recognize an emergency situation upon recognition of a faulty vital function, and to activate safe parking of the vehicle with the aid of the driver assistance system. Sensors 4 which are, for example, designed in the form of an internal camera or a weight sensor may be used for this purpose. Any other type of sensor may also be used to monitor the vital functions of the driver, e.g., the pulse. In addition, a measurement and a spectral analysis of the steering movement of the driver may be used to recognize tiredness or an impairing vital function of the driver. For example, weight sensors in the seat of vehicle 1 may be provided as sensors 4 which monitor a weight distribution of the driver. In addition, a standard distribution of the weight may be stored in data memory 7.

Monitoring unit 3 has a computing unit 8 with which the driver assistance systems may be activated and moreover information may be requested from an external database 10, or information may be transmitted to a rescue center 11. Database 10, for example, is designed in the form of a cloud computer and has instantaneous information about the weather, the road state, and the traffic in the area where the vehicle is located. In addition, information about the vehicle or information about the driver, in particular information about his/her health state or a pre-existing condition of the driver, may also be stored in database 10.

Depending on the selected specific embodiment, external database 10 has a second communication unit, in particular a transceiver unit 12, using which information may be exchanged with vehicle 1 and/or a rescue center 11, for example. Rescue center 11 also has another communication unit in the form of a transceiver unit 13, for example, in order to receive and send data.

Figure 2:
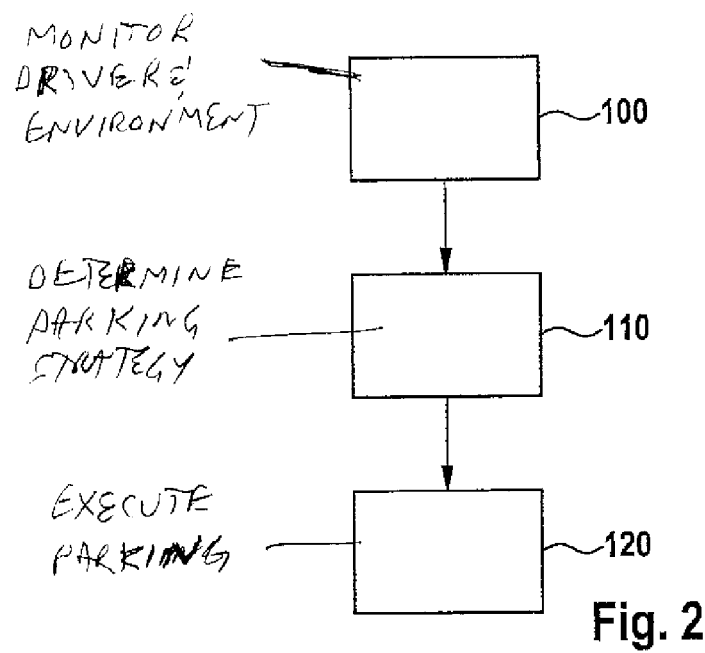
FIG. 2 shows a schematic representation of a program sequence for carrying out the above-described method.

FIG. 2 shows a schematic program sequence for carrying out the method.

In program point 100, vehicle 1 drives and monitoring unit 3 monitors the behavior of the driver, in particular the vital functions, tiredness, the state of distraction and/or intoxication. In addition, computing unit 8 continuously requests information about the surroundings of the vehicle, i.e., information about the weather, traffic, and the state of the roadway, in particular the road shoulder, from external database 10 with the aid of communication unit 6. These data are stored in data memory 7.

In addition, monitoring unit 3 monitors in program point 100 the functionality of the vehicle, in particular the functionality of individual important components of the vehicle, e.g., the tire pressure, the braking system, or the fuel injection system.

In addition, monitoring unit 3 monitors the distribution of the driver's weight. For this purpose, multiple weight sensors are situated in the driver's seat, with the weight sensors detecting the weight distribution and transmitting it to monitoring unit 3. A standard distribution of the weight distribution is stored in the data memory. To recognize an emergency situation, i.e., an unconscious driver, for example, monitoring unit 3 compares the weight distribution detected via the weight sensors to the stored standard distribution. If a predefined deviation of the measured weight distribution from the standard distribution is recognized by monitoring unit 3, an emergency situation is recognized.

Furthermore, an emergency situation is recognized in the event of monitoring unit 3 having a malfunction of a component in the vehicle, a deviation of the vital function of the driver from a predefined vital function, or in the event of recognition of an established state of tiredness or an established state of distraction, or established intoxication. If monitoring unit 3 recognizes an emergency situation in program point 100, the sequence is branched to program point 110. In program point 110, control unit 8 develops a strategy for safely parking the vehicle on the road shoulder based on the present situation, in particular by taking into account data from external database 10. Here, data from the external database, including the weather, the traffic and/or the characteristic of the roadway shoulder, are taken into account, for example, when planning the parking strategy. In addition, computing unit 8 may also access data from the database which include the digital map, for example. In the process of developing the parking strategy, it is initially detected, for example, in which lane the vehicle is located, whether there are vehicles following behind, how far away they are, and at what speed the following vehicles are traveling.

In the process of developing the parking strategy, the surroundings of the vehicle at close range are detected with the aid of sensors. In the process, the speed and/or the distance of a following vehicle is/are detected in particular and taken into account when parking the vehicle, and in particular when decelerating the vehicle.

Furthermore, computing unit 8 primarily checks the characteristic of the roadway and/or the characteristic of the road shoulder in the driving direction up to an established distance from the position of the vehicle with regard to an optimal stop. Here, data from data memory 7, in particular digital data of a road map, are taken into account which may, for example, also be stored in a navigation system. Moreover, data from external database 10 may be taken into account with regard to the characteristic of the road shoulder. When checking the suitability of the road shoulder for parking the vehicle, a check is made, for example, as to whether a ramp, a bridge, a grass strip, or a slope is present by the road shoulder. These occurrences are not suitable for parking the vehicle. If, however, a normal tarred standing lane is present on the road shoulder, it may be used for parking the vehicle.

After establishing the parking strategy, computing unit 8 starts the required driver assistance systems in following program point 120 for safely parking the vehicle in the present lane or on the road shoulder, in particular without the driver's intervention. Parking may, for example, include deceleration or a lane change followed by deceleration. Moreover, the hazard lights may be turned on during parking in order to indicate the parking action to other road users. Depending on the present traffic, the speed of the vehicle is reduced by overriding the brake system and the fuel injection system. In addition, the steering of the vehicle is taken over by the driver assistance system when the emergency situation is based on the driver's own emergency situation. In the presence of a technical error in the vehicle, the guidance of the vehicle may continue to be carried out by the driver, at least partially.

In addition, the presence of an emergency situation may be transmitted to other vehicles via a data transmission in the form of a vehicle-to-vehicle communication. Furthermore, the data about the road shoulder may also be received by other vehicles via a data transmission in the form of a vehicle-to-vehicle communication.

The vehicle is driven in the direction of the optimal stopping place to the right on the road shoulder. In the process of a lane change to the right, the traffic situation is taken into account, i.e., vehicles driving on the right-hand lane ahead and behind the vehicle. Moreover, a distance from the preceding vehicles is maintained with the aid of the automatic distance control.

Furthermore, in addition to the automatic parking of the vehicle, information is also output to vehicles in the surrounding area of the vehicle indicating that there is an emergency. This may, for example, take place with the aid of the vehicle-to-vehicle communication by turning on hazard lights or by transmitting a piece of information that an emergency situation is present. Moreover, a corresponding message indicating the position of the vehicle, data about the vehicle, and data about the driver, in particular about the health state of the driver, may be transmitted to rescue center 11 with the aid of computing unit 8 and communication unit 6, at the same time that the recognition of a vehicular emergency situation takes place. In addition, initiated by computing unit 8, other information about the vehicle, the position of the vehicle, and the information about the driver, in particular information about the health state of the driver, may be transmitted to rescue center 11 by accessing database 10. For example, medical records of the driver may be accessed with the aid of external database 10. Depending on the selected specific embodiment, the rescue center thus has technical information about the vehicle, information about the surroundings of the vehicle, in particular the stopping place of the vehicle, or information about the driver, in particular information about the state of health and, for example, the health history of the driver, at its disposal. Using this information, the rescue of the driver with respect to health-related aspects and the recovery of the vehicle or the repair of the vehicle may be optimized.

To check the concentration of the driver, an internally placed video camera may, for example, be used as a sensor, the camera monitoring the attention of the driver and outputting warning signals to the driver in the presence of corresponding signs of inattention or assuming a subfunction of the driving function of the vehicle or the entire driving function of the vehicle.

Moreover, depending on the selected specific embodiment, a warning sign may be signaled by monitoring unit 3 upon recognition of increasing tiredness or inattention, or suggestions for a break may be displayed. Moreover, the frequency for displaying suggestions for parking lots or resting places, or cafes may be increased based on the evaluation of the driver's state. Conclusive signs of tiredness are recognized by long yawning or closing eyes, for example. Depending on the selected specific embodiment, the driving function of the driver may be given back to the driver upon restored driving capability after the driving function was taken over by the driver assistance systems.

In the case of automatically parking the vehicle, data from the digital map of the vehicle are taken into account by considering the traffic situation, detected via sensors, within close range of the vehicle. Moreover, information from the map for the far range may be taken into account, it being checked, for example, whether a stopping place, in particular an emergency stopping place or a parking lot, is present within a predefined distance in the driving direction of the vehicle.

The information about automatic parking may be transmitted to other vehicles or to a traffic radio or an external database or to a police station.

In another specific embodiment, an emergency situation according to program point 100 is recognized even if the driver assistance system carries out a driving function and wants to give it back to the driver, but the driver does not accept it. Then, the sequence is branched to program point 110 and the vehicle is automatically parked. If, however, the driver lets the system recognize during the automatic parking by way of an input that he/she is now capable of taking over the driving function, the automatic parking is interrupted and the guidance of the vehicle is transferred to the driver. The driving function may be an automatic steering of the vehicle, for example.

What is claimed is:

1. A method for automatically parking a vehicle, comprising:
- checking, using a monitoring of the vehicle, whether an emergency situation is present; and
- automatically parking the vehicle, by a driver assistance system of the vehicle, upon recognition of an emergency situation;
- wherein the driver assistance system requests information from an external database and takes into account the requested information in automatically parking the vehicle,
- wherein the driver assistance system is configured to selectively transfer the control of the driving function to the driver, and
  - (i) if the driver assistance system indicates to the driver an intended transfer of control of the driving function to the driver but the driver refuses to take control of the driving function, an emergency situation is recognized and the vehicle is automatically parked by the driver assistance system, and
  - (ii) if the driver assistance system indicates to the driver an intended transfer of control of the driving function to the driver and the driver indicates an intent to take control of the driving function, the automatic parking of the vehicle is interrupted by the driver assistance system.

2. The method as recited in claim 1, wherein at least one of (i) data of a digital map regarding a road shoulder and (ii) information of the external database regarding the road shoulder is taken into account by the driver assistance system.

3. The method as recited in claim 2, wherein a weight distribution of the driver is monitored and an emergency situation is recognized in the case of a predefined deviation of the weight distribution from a predefined reference distribution.

4. The method as recited in claim 2, wherein a selected technical function of the vehicle is checked and an emergency situation is recognized when the selected technical function does not have a predefined functionality.

5. The method as recited in claim 2, wherein the surroundings of the vehicle are detected by sensors and taken into account by the driver assistance system.

6. The method as recited in claim 2, wherein at least one of (i) a speed of a target vehicle ahead and (ii) a distance from the target vehicle is detected and taken into account by the driver assistance system during braking and changing lanes.

7. The method as recited in claim 2, wherein upon recognition of an emergency situation, the vehicle is one of (i) decelerated by the driver assistance system in the lane and stopped, or (ii) the vehicle is driven by the driver assistance system to a road shoulder and stopped.

8. The method as recited in claim 1, wherein at least one of a health state, tiredness, a state of distraction, and intoxication of the driver is checked to recognize an emergency situation.

9. The method as recited in claim 8, wherein a message is output to the driver upon recognition of tiredness of the driver, and wherein one of the frequency of the output or the intensity of the output is a function of the degree of tiredness.

10. A method for automatically parking a vehicle, comprising:
- checking, using a monitoring of the vehicle, whether an emergency situation is present; and
- automatically parking the vehicle, by a driver assistance system of the vehicle, upon recognition of an emergency situation;
- wherein the driver assistance system requests information from an external database and takes into account the requested information in automatically parking the vehicle,
- wherein at least one of (i) data of a digital map regarding a road shoulder and (ii) information of the external database regarding the road shoulder is taken into account by the driver assistance system, and
- wherein upon recognition of an emergency situation:
  - data about the road shoulder in the driving direction of the vehicle are analyzed for a possible stopping place for the vehicle within a defined distance from the vehicle;
  - a stopping place is selected based on the analysis; and
  - the driver assistance system automatically drives the vehicle to the stopping place and parks the vehicle at the selected stopping place.

11. The method as recited in claim 10, wherein upon recognition of an emergency situation, a transmission of additional data about the health of the driver to a rescue center is initiated by the vehicle with the aid of an external database.

12. The method as recited in claim 10, wherein upon recognition of an emergency situation, a transmission of technical data about the vehicle to a rescue center is activated.

13. The method as recited in claim 12, wherein the technical data are one of detected by sensors of the vehicle, read out from an internal database, or read out from an external database.

14. A non-transitory computer-readable data storage medium storing a computer program having program codes which, when executed on a computer, performs a method for automatically parking a vehicle, the method comprising:
- checking, using a monitoring of the vehicle, whether an emergency situation is present; and
- automatically parking the vehicle, by a driver assistance system of the vehicle, upon recognition of an emergency situation;
- wherein the driver assistance system requests information from an external database and takes into account the requested information in automatically parking the vehicle;
- wherein at least one of (i) data of a digital map regarding a road shoulder and (ii) information of the external database regarding the road shoulder is taken into account by the driver assistance system; and
- wherein upon recognition of an emergency situation:
  - data about the road shoulder in the driving direction of the vehicle are analyzed for a possible stopping place for the vehicle within a defined distance from the vehicle;
  - a stopping place is selected based on the analysis; and
  - the driver assistance system automatically drives the vehicle to the stopping place and parks the vehicle at the selected stopping place.

* * * * *